United States Patent [19]
Goto et al.

[11] Patent Number: 5,592,449
[45] Date of Patent: Jan. 7, 1997

[54] DISC APPARATUS USING CHARACTER-BASED CONTROL CODES IN A TABLE OF CONTENTS

[75] Inventors: Soju Goto, Hino; Takashi Kawasaki, Tokyo; Satoshi Hiranuma, Urawa; Nobumasa Suzuki, Hachioji; Izumi Shibata, Tokyo, all of Japan

[73] Assignee: Kabushiki Kaisha Kenwood, Tokyo, Japan

[21] Appl. No.: 557,900

[22] Filed: Nov. 14, 1995

Related U.S. Application Data

[63] Continuation of Ser. No. 142,135, Oct. 28, 1993, abandoned.

[30] Foreign Application Priority Data

Oct. 29, 1992  [JP]  Japan ................. 4-291415

[51] Int. Cl.⁶ ........................... G11B 7/00
[52] U.S. Cl. .................. 369/47; 369/48; 369/58; 369/59; 360/48; 360/53
[58] Field of Search ............... 369/47, 48, 49, 369/54, 58, 59, 124, 32; 360/39, 40, 48, 53

[56] References Cited

U.S. PATENT DOCUMENTS 5,315,570  5/1994  Miura et al. ................ 369/54 X

FOREIGN PATENT DOCUMENTS

| 0417277 | 3/1987 | European Pat. Off. . |
| 0406021 | 1/1991 | European Pat. Off. . |
| 3035475 | 4/1991 | Japan . |
| 4114365 | 4/1992 | Japan . |

*Primary Examiner*—Muhammad N. Edun
*Attorney, Agent, or Firm*—Sixbey Friedman Leedom & Ferguson; Gerald J. Ferguson, Jr.; Evan R. Smith

[57] ABSTRACT

A disc recording/reproducing apparatus capable of controlling the record/reproduction of the apparatus or other devices connected to it, by using character information recorded in U-TOC area. A character code for controlling the apparatus or other devices is recorded in U-TOC area at the location corresponding to each track number recorded in a mini disc at each delimiter of a musical program. During the reproduction of a musical program recorded in the mini disc by the disc recording/reproducing apparatus, the character code added in correspondence with the track number is read and the reproduction operation is controlled in accordance with the character code.

16 Claims, 3 Drawing Sheets

(A) | TNO1 RECORDED | UNRECORDED |

(B) | TNO1 | TNO2 | TNO3 | UNRECORDED |

(C) | TNO1 ABC@#G6% | TNO2 BAD@&D5% | TNO3 CAT | UNRECORDED |

(D) | TNO1 ABC@#G6% | UNRECORDED |

DISC APPARATUS USING CHARACTER-BASED CONTROL CODES IN A TABLE OF CONTENTS

This application is a continuation of Ser. No. 08/142,135, filed Oct. 28, 1993, now abandoned.

BACKGROUND OF THE INVENTION

1. Field of the Invention

The present invention relates to a disc recording/reproducing apparatus, and more particularly to a disc recording/reproducing apparatus suitable for controlling the apparatus or other external devices in accordance with control information recorded in a U-TOC area of a disc, the U-TOC area being a table of contents (TOC) area in which a user writes data.

2. Related Background Art

A recordable MD disc has a spiral groove engraved in the record area of the disc. The engraved spiral groove has a swell so that a swell frequency of 22.05 kHz can be detected when the disc rotates at a standard rotation speed. Therefore, the rotation of MD is controlled by maintaining the detected frequency to be 22.05 kHz. The swell is FM modulated by address information at the deviation frequency of 1 kHz. This address information is used to detect a particular position of the spiral groove. In the recordable MD address system, a logical access is executed in units of a cluster containing 36 sectors. Namely, the address of a sector is represented by a 16-bit cluster address and an 8-bit sector address. For example, an address (11FFH: 1FH) indicates the cluster address of 11FFH and the offset sector address 1FH of the cluster at 11FFH. The disc area of a recordable MD includes, as shown in FIG. 3, a lead-in area, a U-TOC area, and a recordable user area. A music program is recorded in the recordable user area. TNO-1 to TNO-255 are identifiers to be assigned to a plurality of music programs. For example, if a music program TNO-5 is recorded in the region from a start address 1F0BH: 0AH to an end address 2A2AH: 2BH, the identifier TNO-5 and its associated start address are stored in section 0 of the U-TOC area. Optionally, the identifiers and the music program names are stored in section 1 of the U-TOC area, as illustrated in FIG. 4. The U-TOC is therefore an information management table for music programs stored in the recordable user area.

ASCII code characters can be recorded in sector 1 of the U-TOC area and added to each TNO. However, in a conventional MD disc recording/reproducing apparatus, character information recorded in sector 1 of the U-TOC area of an MD has been used only for displaying character information on the display unit of the apparatus.

SUMMARY OF THE INVENTION

The present invention has been made in consideration of the above circumstances. It is an object of the present invention to eliminate the conventional disadvantages and provide a disc recording/reproducing apparatus for controlling the apparatus or other devices connected to it during the record/reproduction of information, by using character information recorded in the U-TOC area.

According to one aspect of the present invention, there is provided a disc recording/reproducing apparatus for recording/reproducing information in/from a disc having a TOC area capable of recording a character and symbol in correspondence with a track number added to the recorded information at a desired position, wherein a character signal for controlling the disc recording/reproducing apparatus is recorded in the TOC area.

The character signal may be used for controlling another device connected to the disc recording/reproducing apparatus.

The character signal may be used for inhibiting to erase information recorded in the disc.

According to another aspect of the present invention, there is provided a disc recording/reproducing apparatus for recording/reproducing information in/from a disc having a TOC area capable of recording a character and symbol in correspondence with a truck number added to the recorded information at a desired position, wherein a character signal for controlling the disc recording/reproducing apparatus is recorded in the TOC area, and the disc recording/reproducing apparatus is controlled in accordance with the character signal read from the disc.

BRIEF DESCRIPTION OF THE DRAWINGS

FIGS. 2A to 2D shows TNOs and associated characters recorded in the U-TOC area, wherein FIG. 2A illustrates the state of one TNO of a recorded program, FIG. 2B illustrates the state of three TNOs of recorded programs, FIG. 2C illustrates the state of three recorded TNOs and associated characters, and FIG. 2D illustrates the state of one TOC and associated characters not deleted.

DETAILED DESCRIPTION OF THE PREFERRED EMBODIMENTS

An embodiment of the disc recording/reproducing apparatus according to the invention will be described with reference to FIGS. 1 and 2.

Figure 1:
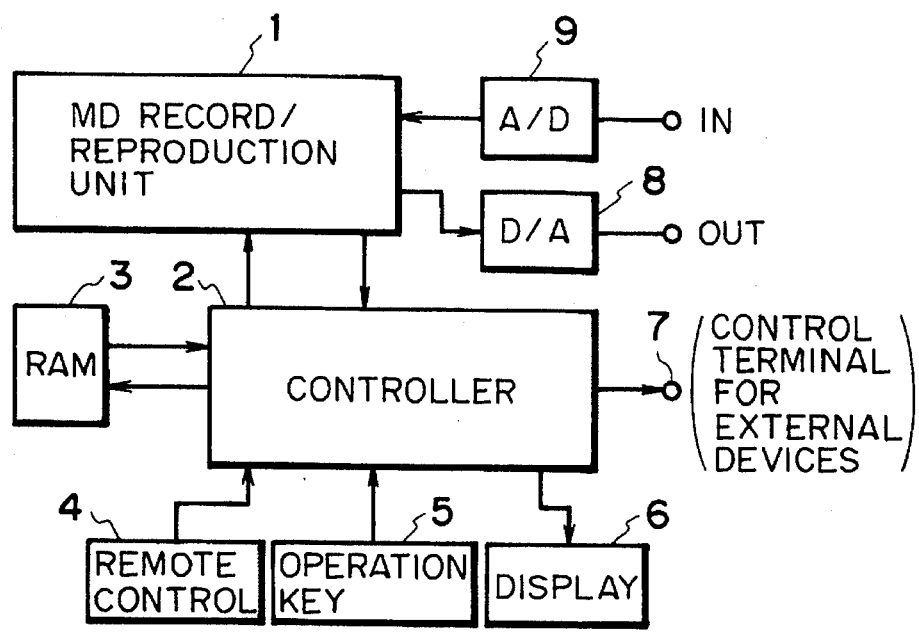
FIG. 1 is a block diagram of a disc recording/reproducing apparatus according to an embodiment of the present invention.
Figure 2:
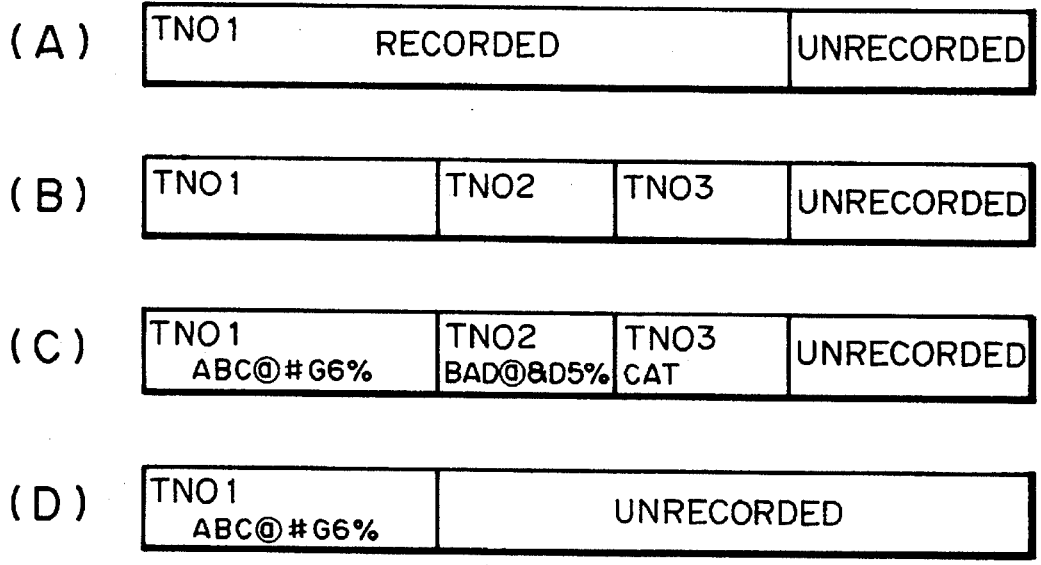
Figure 3:
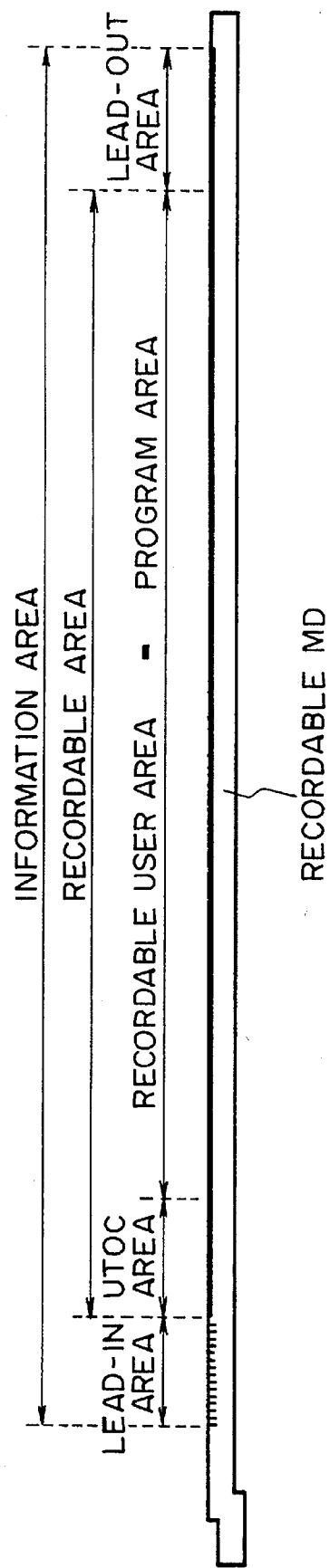
FIG. 3 is a schematic diagram showing the structure of an MD.
Figure 4:
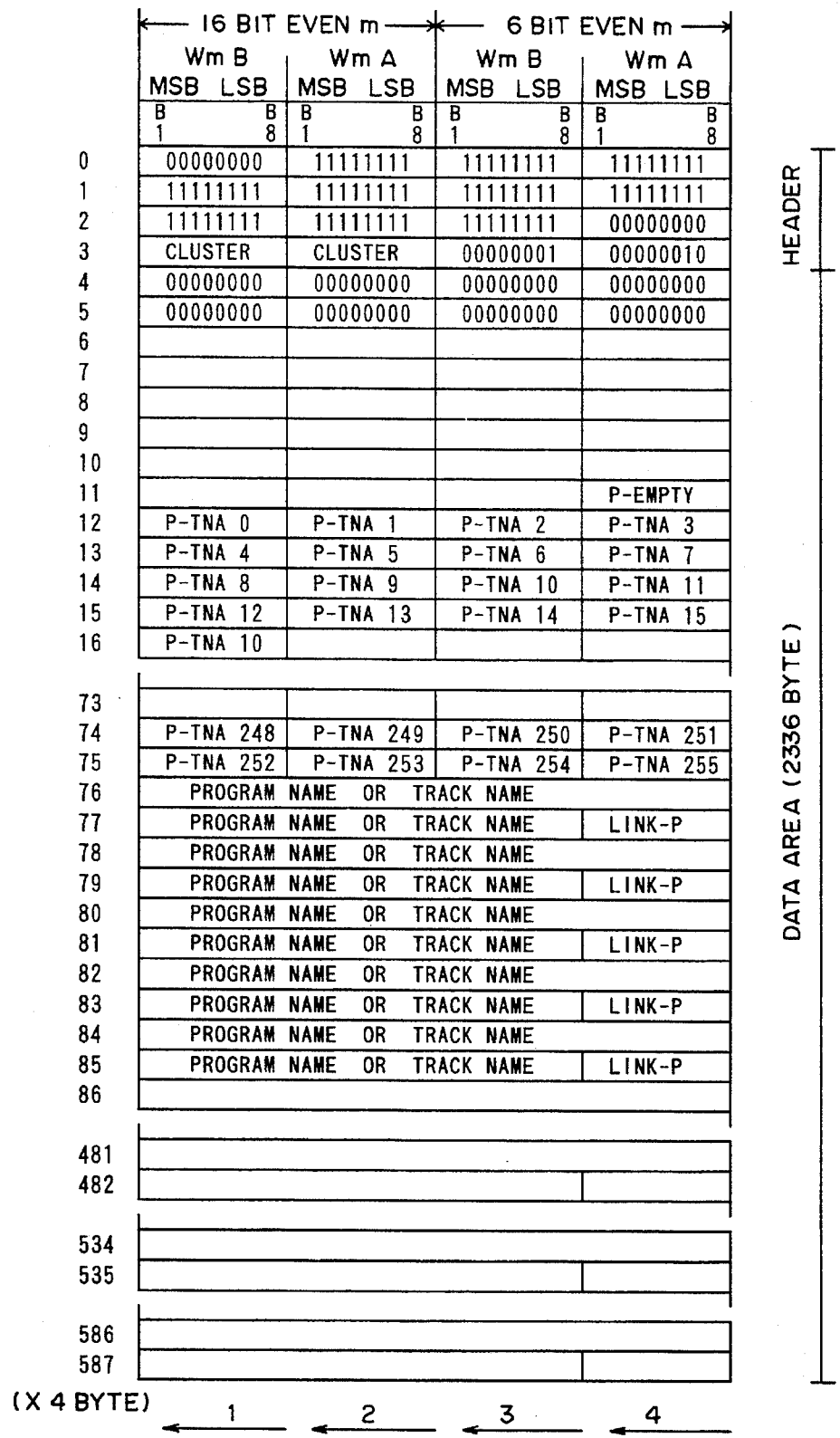
FIG. 4 shows examples of the contents of section 1 of the U-TOC area of an MD.

FIG. 1 is a block diagram of a disc recording/reproducing apparatus according to an embodiment of the present invention. FIGS. 2A to 2D shows TNOs and associated characters recorded in the U-TOC area, FIG. 2A illustrates the state of one TNO of a recorded program, FIG. 2B illustrates the state of three TNOs of recorded programs, FIG. 2C illustrates the state of three recorded TNOs and associated characters, and FIG. 2D illustrates the state of one TOC and associated characters not deleted.

Referring to FIG. 1, reference numeral 1 represents an MD record/reproduction unit for an MD (64 mm diameter) which is a rewritable disc. The MD record/reproduction unit 1 includes a mechanism section for mechanically driving an MD, a control section for controlling the mechanism section, and a signal processing section for encoding or decoding a signal based upon an MD format. The MD record/reproduction unit 1 is controlled by a controller 2 to execute record, reproduction, search, or other operations. The MD record/reproduction unit 1 supplies the controller 2 with the information recorded in an MD and the information representing the operation state of the apparatus.

The controller 2 supplies a control signal to the MD record/reproduction unit 1, and receives information from an MD to store necessary information in a RAM 3. The controller 2 reads data from RAM when necessary to display a time and characters and generate data for a search operation. The controller 2 analyzes character codes to transfer control data to the MD record/reproduction unit 1 or to an external device control terminal 7. Information read from an MD or the operation state of the MD record/reproduction unit 1 is displayed on a display unit 6 under the control of the controller 2, upon manipulation of a remote controller 4 or an operation key 5.

RAM 3 temporarily stores lead-in information and U-TOC information copied from an MD during the read/write operation under the control of the controller 2. An external device control signal sent from the controller 2 is transferred via the external device control terminal 7 to external devices such as an amplifier and a graphic device connected to the MD disc recording/reproducing apparatus. A D/A controller 8 converts a digital signal reproduced by the MD record/reproduction unit 11 into an analog signal which is outputted to an analog amplifier (not shown). An A/D converter 9 converts an analog signal such as an externally inputted musical program into a digital signal.

The operation of the apparatus constructed as above will be described next.

An MD is loaded on the MD disc recording/reproducing apparatus shown in FIG. 1. The remote controller 4 or the operation key 5 is manipulated to instruct the remote controller 2 to record a certain number of musical programs. The controller 2 instructs the MD record/reproduction unit 1 to record musical signals supplied from the A/D converter 9.

When it is instructed to add TNOs as delimiters to the recorded musical signals shown in FIG. 2A, by manipulating the remoter controller 4 or operation key 5 while reproducing them from the MD, the controller 2 calculates the address of each delimiter and stores a corresponding TNO, e.g., TNO-1 in RAM 3, as shown in FIG. 2B.

Next, when it is instructed to write a title (program name) and other characters to be added to each TNO, by manipulating the remote controller 4 or operation key 5, the controller 2 writes the program name and characters added to each TNO in RAM 3 at the area corresponding to each TNO.

The added characters are assigned particular meanings. For example, characters inserted between "@" and "5" are used as control codes. The character immediately after "@" is a control code for its own MD disc recording/reproducing apparatus, and the second and following characters are a control code for other devices.

In the example shown in FIG. 2C, of the characters "ABC@#G6%" added to TNO-1, the characters "ABC" on the left side of "@" stand for the title of TNO-1, and the characters inserted between "@" and "%" stand for control codes. Namely, the character "#" after "@" stands for a control code meaning an erase inhibition, and the characters "G6" stand for a control code for setting the sixth frequency characteristic mode to a graphic equalizer as an external device.

Like TNO-1, of the characters "BAD@&D5%" added to TNO-2, the characters "BAD" stand for the title of TNO-2, and the characters inserted between "@" and "%" stand for control codes. Namely, the character "$" after "@" means that no control code has been set, and the characters "D5" stand for a control code for setting the fifth sound field mode to a DSP as an external signal processing device.

For TNO-3, although "CAT" indicating the title of TNO-3 is added, no control code is added to TNO-3.

When it is instructed to reproduce musical programs recorded on the MD starting from TNO-1, by manipulating the remote controller 4 or operation key 5, the controller 2 accesses RAM 3 to read the start address information and character codes for TNO-1 and instructs the MD record/reproduction unit 1 to reproduce the musical program of TNO-1. The controller 2 also analyzes the external device control code "G6" and outputs a corresponding control signal from the external device control terminal 7.

For the reproduction of the next musical program of TNO-2, the controller 2 accesses RAM 3 to read the start address information and character codes for TNO-2 and instructs the MD record/reproduction unit 1 to reproduce the musical program of TNO-2. The controller 2 also analyzes the external device control code added to TNO-2 after sending a signal for canceling the previous external device control signal. Then, the controller 2 makes the display 6 to display the title "BAD" for TNO-2, and sends via the terminal 7 the new external device control signal for setting the fifth sound field mode to DSP as the external device.

When it is instructed to erase all the musical programs of TNO-1 to TNO-3, by manipulating the remote controller 4 or operation key 5, the controller 2 accesses RAM 3 to read the control codes added to respective TNOs, and erases the musical programs of TNO-2 and TNO-3 excepting the musical program of TNO-1 because of the erase inhibition code "#". Even if a new musical program is to be recorded in the area of TNO-1, this new musical program is recorded in the area next to TNO-1 without erasing the program of TNO-1.

When it is instructed to unload the MD, by manipulating the remote controller 4 or operation key 5, the controller 2 sends a signal for unloading the MD after writing the U-TOC information at that time to the MD, to the MD record/reproduction unit 1. Upon reception of this signal, the MD record/reproduction unit 1 records the U-TOC information in the MD at the U-TOC area, and thereafter ejects the MD out of the apparatus.

In the embodiment, control codes of particular characters are used for the MD recording/reproducing apparatus and other devices. The invention is not limited to the embodiment only, but such control codes of particular characters may be adapted to be neglected by setting a "control code inhibition" mode to the MD recording/reproducing apparatus.

A custom code may be used to neglect the control code if the same custom code is not entered.

According to the disc recording/reproducing apparatus of this invention, the apparatus can be controlled by the control information added to each TNO and recorded on the disc. For example, if the erase inhibition code is added, the musical program with this code is prevented from being erased inadvertently.

Other devices connected to the disc recording/reproducing apparatus can be controlled by the control information added to each TNO, such as the control of the frequency characteristic of a graphic equalizer of a sound synthesizer, the control of the sound field of DSP, and the control of Dolby Pro-logic reproduction. Accordingly, a user is not necessary to arrange the settings of each external device so as to match each musical program, providing the user with a comfortable and relaxed mood for listening to musical programs.

What is claimed is:

1. A disc recording/reproducing apparatus for recording/reproducing information in/from a disc having a TOC area capable of recording a character in correspondence with a track number appended to the recorded information at a desired position in the disc, characterized in that it further comprises:

means for entering a string of characters which includes at least two first and second specific characters as control codes and ordinary characters to store the string of characters in said TOC area, and means for sequentially reading the string of the characters stored in said TOC area and forming a control signal identified by ordinary character or characters interposed between said first and second specific characters in the string, the control signal being used to control said disc recording/reproducing apparatus or control another device connected to said disc recording/reproducing apparatus.

2. The apparatus according to claim 1, wherein said control code is used for inhibiting erasure of information recorded in said disc.

3. The apparatus of claim 1 further comprising means for displaying the control code.

4. The apparatus of claim 1 further comprising means for setting the apparatus into a mode wherein the apparatus disregards the control code read from the TOC area.

5. The apparatus of claim 1 wherein said control code includes a custom code and the apparatus disregards the control code read from the TOC area when the custom code in the control code does not coincide with a specific code assigned to the apparatus.

6. The apparatus of claim 1 wherein said means for recording a control code further comprises user input means for receiving control code input from a user to be recorded on the disc by said means for recording a control code.

7. The apparatus of claim 6 wherein the control code input from the user is a control code inhibiting erasure of information recorded in said disc.

8. The apparatus of claim 1 wherein said control signal controls an amplifier connected to said disc recording/reproducing apparatus.

9. The apparatus of claim 1 wherein said control signal controls a digital signal processor connected to said disc recording/reproducing apparatus.

10. The apparatus of claim 1 wherein said control signal controls frequency characteristics of a graphic equalizer connected to said disc recording/reproducing apparatus.

11. A disc recording/reproducing apparatus for recording/reproducing information in/from a disc having a TOC area capable of recording characters which represent a music program name, in correspondence with a track number appended to the recorded information at a desired position in the disc, characterized in that it further comprises:

means for recording, into the same TOC area which stores the characters representing the: music program name, characters of a control code and at least one discriminating character for discriminating the control code characters from the music program name characters, the control code being used to control said disc recording/reproducing apparatus or control another device connected to said disc recording/reproducing apparatus, and means for simultaneously displaying the characters representing the music program name, the control code, and the discriminating character.

12. A disc recording and reproducing apparatus for use with a disc having a TOC area capable of recording a character in correspondence with a track number appended to the recorded information at a desired position in the disc, comprising:

recording and reproducing means for recording information on the disc and reproducing information from the disc;

control code entry means connected to the recording and reproducing means for entering a string of characters and storing them in said TOC area, the string of characters including first and second control code identifying characters and control code characters located between said first and second control code identifying characters;

readout means connected to the recording and reproducing means for sequentially reading the string of characters stored in said TOC area, identifying the control code characters by locating said first and second control code identifying characters and selecting the characters between said first and second control code characters as the control characters, and generating a control signal output comprising an electrical representation of the control characters; and control means connected to said readout means for receiving said control signal output from the readout means and controlling said recording and reproducing means.

13. The apparatus of claim 12 where said control means is connected to an external device associated with the apparatus and said control means controls said external device based on said control signal output.

14. The apparatus of claim 13 wherein said external device is an amplifier for musical signals.

15. The apparatus of claim 13 wherein said external device is a digital signal processor for musical signals.

16. The apparatus of claim 13 wherein said external device is a graphic equalizer for musical signals and said control signals control a frequency characteristic of the graphic equalizer.

* * * * *